I. E. PALMER.
TRACKLESS POWER DRIVEN VEHICLE.
APPLICATION FILED JUNE 20, 1911.
1,022,151.
Patented Apr. 2, 1912.
5 SHEETS—SHEET 1.
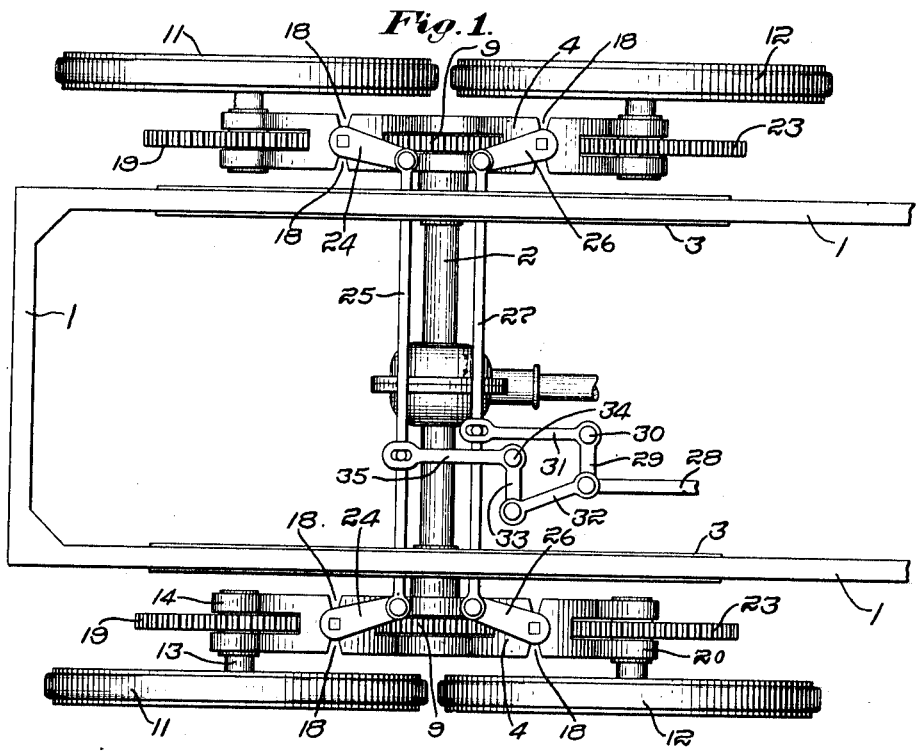
Fig. 1.
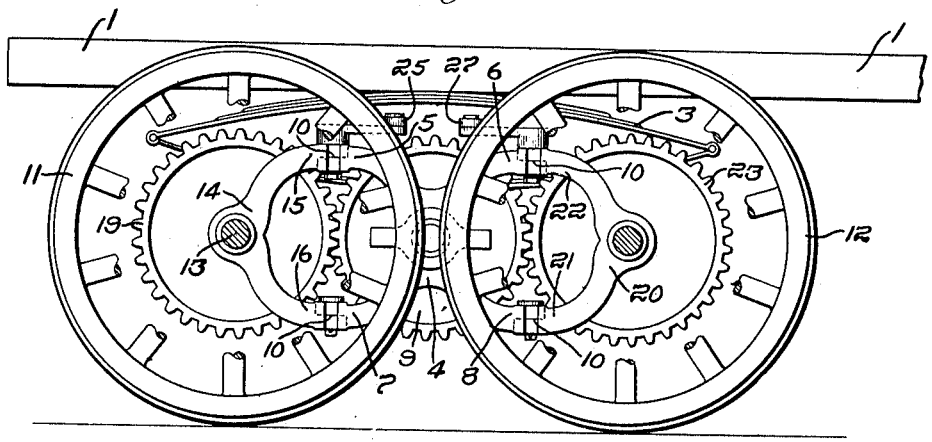
Fig. 2.
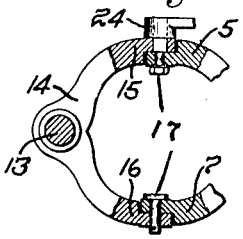
Fig. 2.ᵃ
Witnesses:
Carl L. Choate.
Horace A. Crossman
Inventor:
Isaac E. Palmer,
by Emery, Booth, Janney & Varney
Attys.

I. E. PALMER.
TRACKLESS POWER DRIVEN VEHICLE.
APPLICATION FILED JUNE 20, 1911.
1,022,151.
Patented Apr. 2, 1912.
5 SHEETS—SHEET 2.
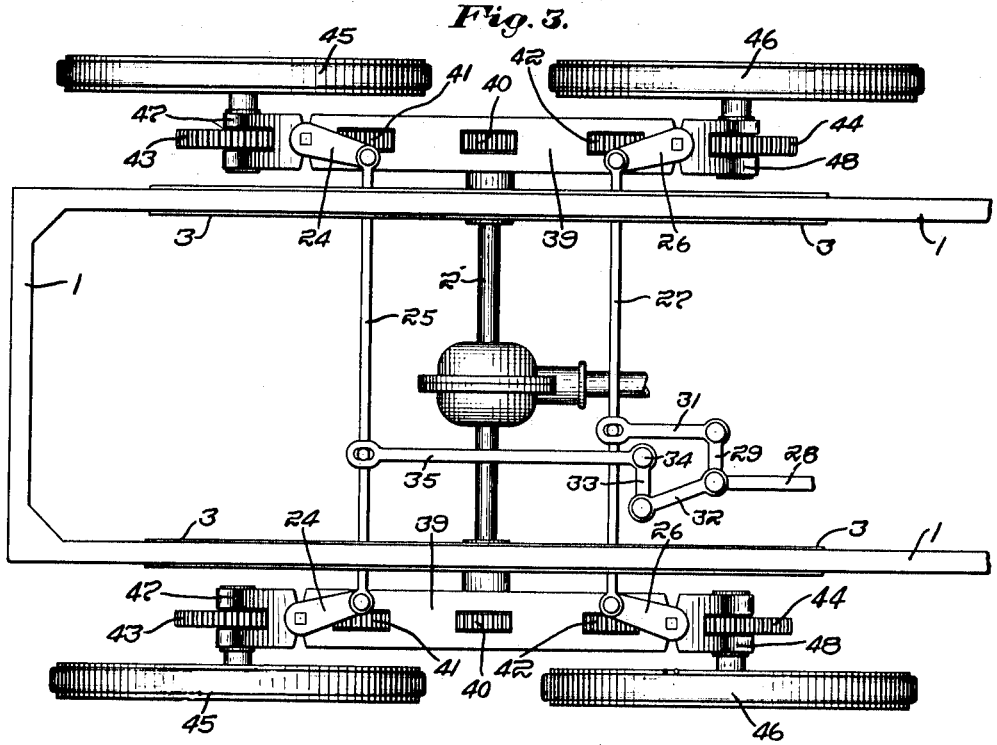
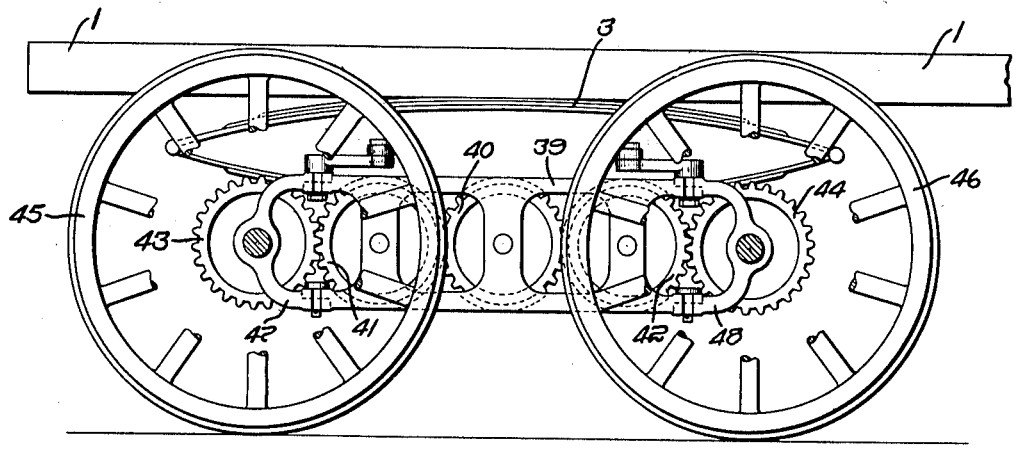
Witnesses:
Carl L. Choate.
Horace A. Crossman
Inventor:
Isaac E. Palmer,
by Emery, Booth, Janney & Varney
Attys.

I. E. PALMER.
TRACKLESS POWER DRIVEN VEHICLE.
APPLICATION FILED JUNE 20, 1911.

1,022,151.

Patented Apr. 2, 1912.

5 SHEETS—SHEET 3.

Witnesses:
Carl L. Choate
Horace A. Crossman

Inventor:
Isaac E. Palmer,
by
Emery, Booth, James & Varney,
Attys.

I. E. PALMER.
TRACKLESS POWER DRIVEN VEHICLE
APPLICATION FILED JUNE 20, 1911
1,022,151.
Patented Apr. 2, 1912.
5 SHEETS—SHEET 4.
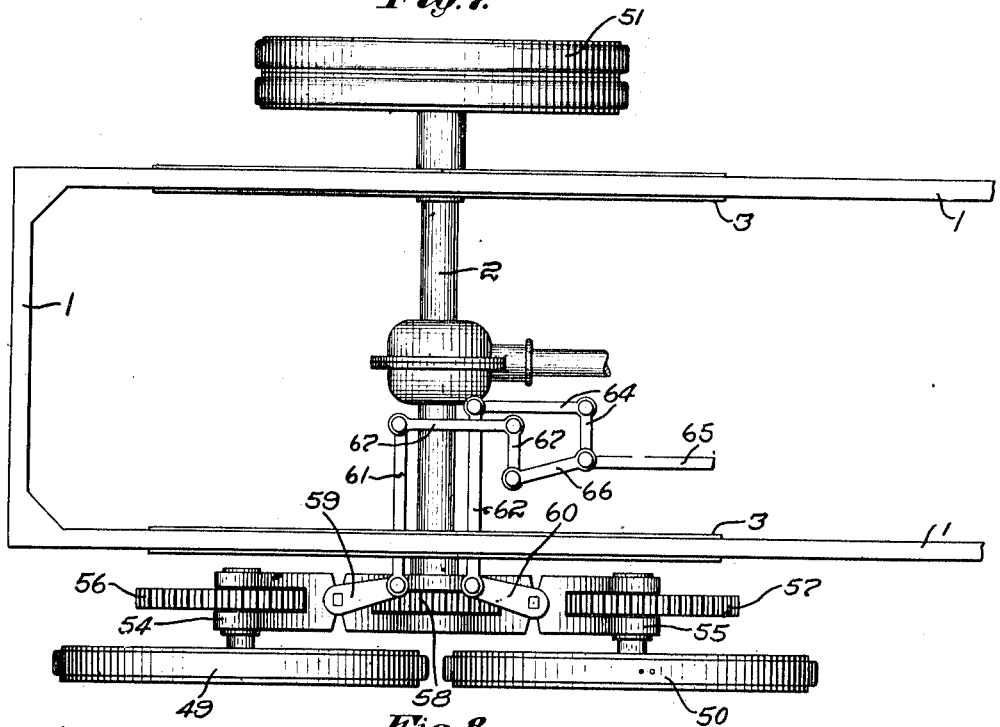
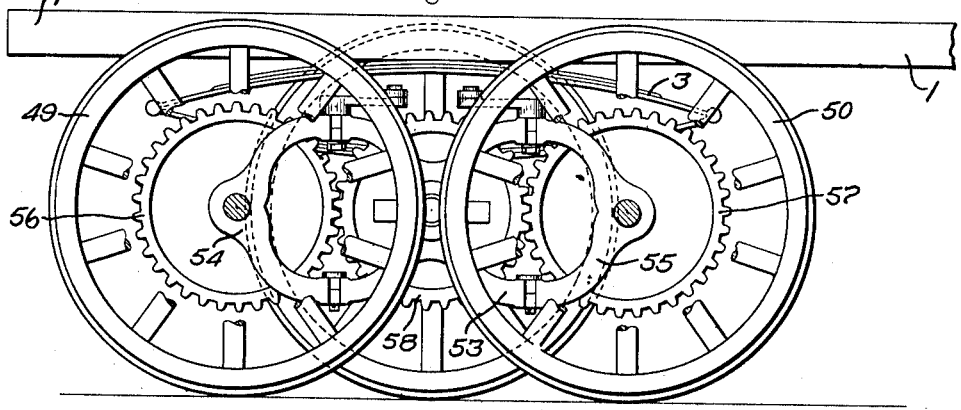
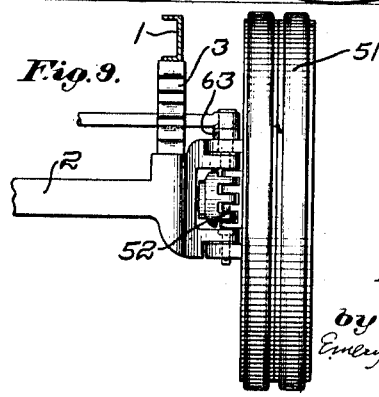
Witnesses:
Carl L. Choate.
Horace A. Crossman
Inventor:
Isaac E. Palmer,
by
Emery, Booth, Janney & Varney
Attys.

I. E. PALMER.
TRACKLESS POWER DRIVEN VEHICLE.
APPLICATION FILED JUNE 20, 1911.
1,022,151.
Patented Apr. 2, 1912.
5 SHEETS—SHEET 5.
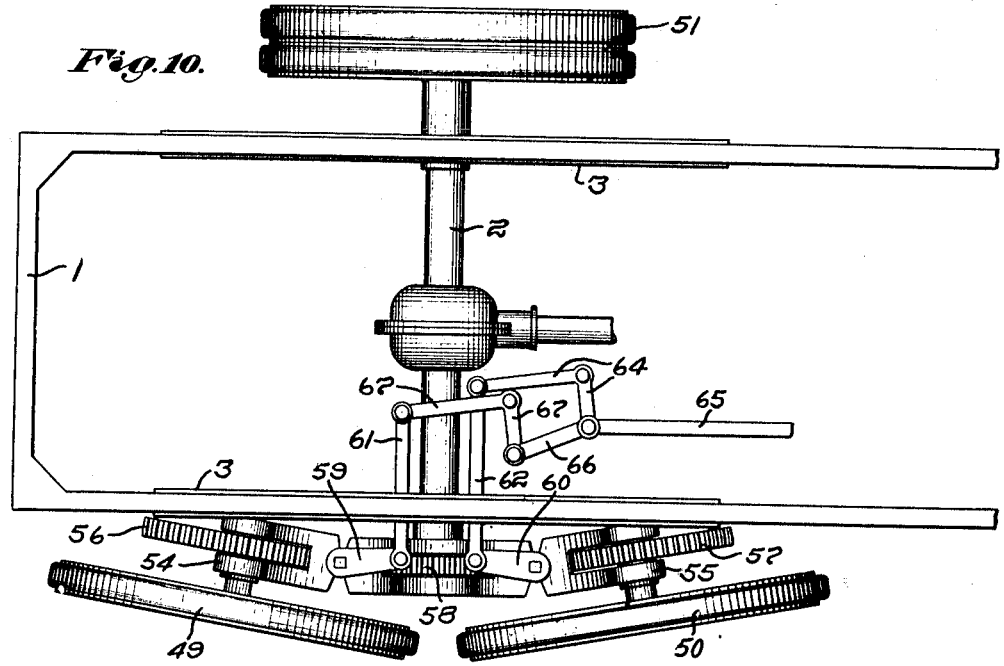
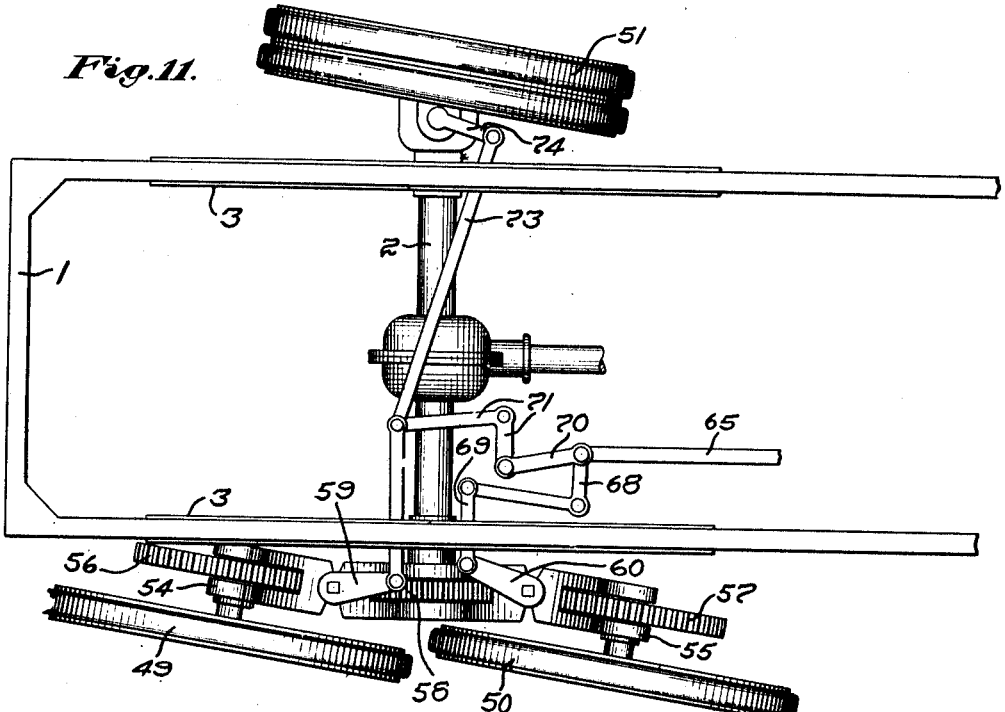
Witnesses:
Carl L. Choate
F. Irene Chandler
Inventor:
Isaac E. Palmer,
by Emery Booth, James Varney
Attys.

UNITED STATES PATENT OFFICE.

ISAAC E. PALMER, OF MIDDLETOWN, CONNECTICUT.

TRACKLESS POWER-DRIVEN VEHICLE.

1,022,151. Specification of Letters Patent. Patented Apr. 2, 1912.

Application filed June 20, 1911. Serial No. 634,266.

*To all whom it may concern:*

Be it known that I, ISAAC E. PALMER, a citizen of the United States, and a resident of Middletown, in the county of Middlesex and State of Connecticut, have invented an Improvement in Trackless Power - Driven Vehicles, of which the following description, in connection with the accompanying drawings, is a specification, like characters on the drawings representing like parts.

This invention relates to trackless, power driven vehicles and has for its object more particularly to provide a construction whereby if desired the use of pneumatic tires may be avoided, to provide increased traction, more extensive wheel support, and improved wheel-deflecting mechanism.

In order that the principles of the invention may be clearly understood, I have in the accompanying drawings disclosed certain embodiments thereof, wherein—

Figure 5:
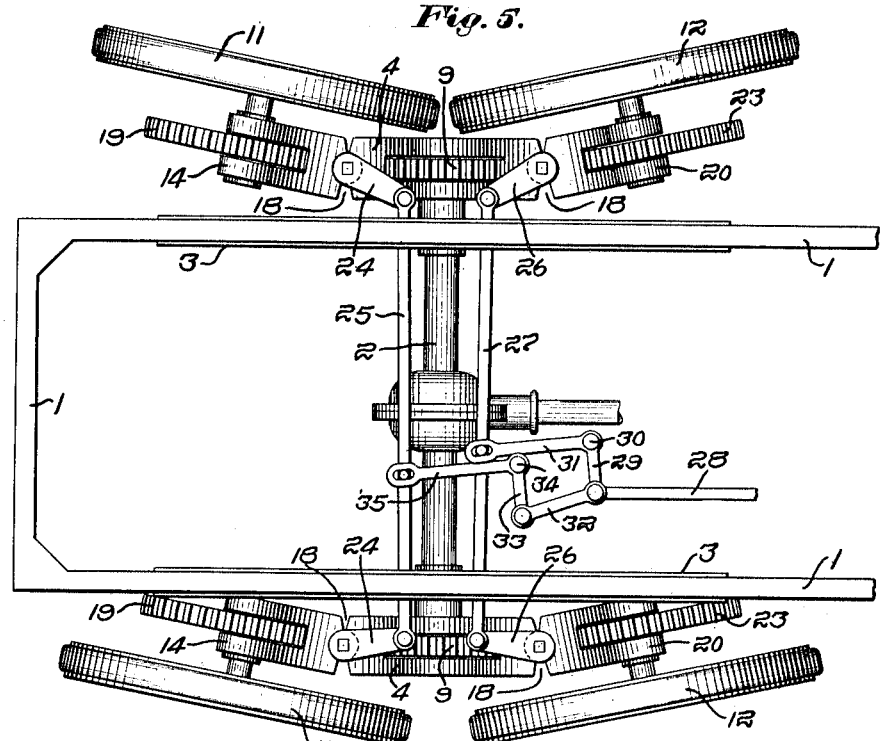
Figure 6:
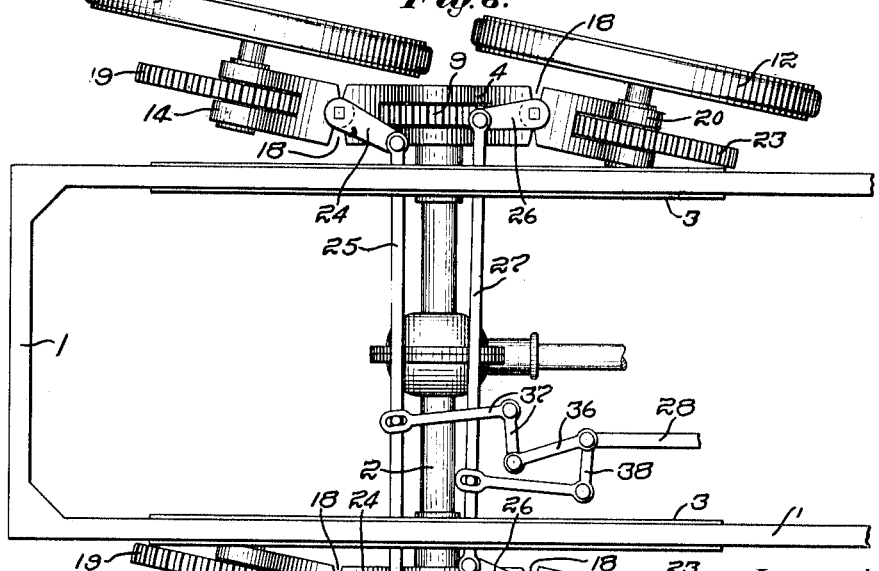

Figure 1 is a plan view of a portion of a body and running gear of a trackless, power driven vehicle embodying my invention; Fig. 2 is a side elevation of the construction shown in Fig. 1; Fig. 2ª is a detail partly in vertical section showing the connection between a main and a supplemental frame; Fig. 3 is a view similar to Fig. 1, of a modified form of my invention; Fig. 4 is a view similar to Fig. 2, of that form of my invention shown in Fig. 3; Fig. 5 is a plan view similar to Fig. 1 but representing the wheels as laterally deflected; Fig. 6 is a view generally similar to Fig. 1 but illustrating a slightly modified steering connection whereby the wheels on opposite sides are deflected in the same direction; Fig. 7 is a view similar to Fig. 1 but showing a three-wheeled arrangement; Fig. 8 is a side elevation of that form of my invention shown in Fig. 7; Fig. 9 is a view, mainly in front elevation, of the single wheel and its connection to the drive shaft; Fig. 10 is a view similar to Fig. 7, but illustrating the traction wheels at one side as laterally deflected in opposite directions; and Fig. 11 is a similar view, but representing a somewhat different connection to the steering mechanism, whereby the traction wheels at one side are laterally deflected in parallelism.

In each of the figures of the drawings I have represented a portion only of the frame of a trackless, power driven vehicle. While the portion of the frame illustrated may be either the front or rear thereof, the said portion is, in this case, designed to serve as the rear portion of the vehicle, and for that purpose it is provided with a suitable drive shaft. As disclosed in my Patents, Nos. 938,782, 938,783, 938,784, 938,786, 939,077, and 939,158, all granted November 2, 1909, the frame of the vehicle is designed to be supported by front and rear sets of wheels, each set including two or more. That is to say, the front set of wheels may be made up of two placed on opposite sides; or three, one being placed upon one side and two on the opposite side; or four, two being placed on opposite sides; or any other suitable arrangement of front wheels may be provided. The rear set of wheels is preferably composed of three or four wheels. In the former case, two wheels are arranged upon one side and one upon the opposite side and preferably in staggered relation therewith, as shown in Figs. 7 and 8, while if four wheels are employed, they are preferably arranged two upon each side, in substantial alinement, it being evident however that the wheels upon opposite sides may be placed one somewhat in advance of its companion wheel, as clearly disclosed in my Patent No. 844,615, February 19, 1907.

In my patents to which I have referred I have disclosed various mechanisms for driving the wheels, whether of the front or rear portion of the frame, in conjunction with steering devices therefor. The present invention concerns itself with that arrangement of wheels wherein two wheels are mounted in proximity at one side of the vehicle with a similar or other arrangement at the other side thereof, together with gear wheels for transmitting motion to said wheels, and coöperating steering devices having parts so jointed or connected that in the steering movement they may move with respect to each other on lines coinciding or substantially coinciding with the pitch line of the gear wheels, if toothed gears be provided, or substantially coinciding with the line of driving contact of the wheels whether or not said wheels be provided with teeth.

Referring first to that form of my invention shown in Figs. 1 and 2, the body frame of the vehicle is represented at 1, it being of any suitable construction. The casing for the drive shaft is indicated at 2 and the springs at each side of the vehicle are represented at 3. Supported at each side of the vehicle, upon the casing for the drive shaft, or directly upon the body of the vehicle or in any other suitable manner, is a yoke or frame 4 having upper arms 5, 6 and lower arms 7, 8. Fast upon the drive shaft and extending between the arms of the said yoke is a gear wheel 9, preferably toothed as indicated. Each of the arms 5, 6, 7, 8 is preferably cut away as indicated at 10, and is provided with a pin or spindle receiving socket. The traction wheels are indicated at 11, 11, and 12, 12. Each of the wheels 11 is provided with a hub 13, rotatably mounted in a yoke 14 having an upper arm 15 and a lower arm 16, the extremities of which are oppositely recessed with respect to the arms 5, 7 of the yoke 4, and are provided with sockets adapted to aline with those of the yoke 4, so as to receive pins 17 upon which the yokes 14 may turn with respect to the yoke 4 as more clearly indicated in Fig. 2ª. The adjacent edges of the yokes 4 and 14 are suitably formed as indicated at 18 in Fig. 1 to permit the desired movement of the said yokes 14. Each of the traction wheels 11 is provided with a gear wheel 19 preferably toothed and in driving contact with the adjacent wheel 9. As shown clearly in Fig. 2, the pitch line of the gear teeth of the gear wheels 9 and 19, or the line of driving contact if the said gear wheels be not toothed, is in vertical alinement with the turning axis of the yoke 14, that is to say, in vertical alinement with the pins joining the ends of the yokes 4 and 14, and upon which they are relatively turned in the deflecting movement of the vehicle. Each of the traction wheels 12 is provided with a yoke 20, having arms 21, 22 similar it may be to the arms 15, 16 of the yoke 14, and connected by pins in a similar manner to the arms 6, 8 of the yoke 4. Each of said traction wheels 12, 12 is provided with a gear 23 preferably toothed and meshing or in driving contact with the adjacent gear wheel 9, the line of driving contact or the pitch line of the gear teeth if toothed gears are provided, being in vertical alinement or substantially in vertical alinement with the axial pins or devices pivotally connecting the arms of the yokes 4, 20. Each of the supplemental frames or yokes is thus, in this embodiment of my invention, supported by the adjacent main frame or yoke. The supplemental frames are, as shown, connected for lateral deflection to the main frame on lines eccentric to the axis or axes of the gear or gears that are in driving relation to the axle, that is to the gears 9—9 shown in Figs. 1 and 2 and to the corresponding gears in the other forms of the invention. Formed or rigid with the extremity of each arm 15 of the yoke 14 is a steering arm or lever 24, which receives or has rigid therewith the axial pin connecting the arms 5, 15 of the yokes 4, 14. The two arms or levers 24 are suitably connected together as by a link 25. Similarly, each arm 22 of the yokes 20 has formed or rigid therewith an arm or lever 26, said arms being suitably connected as by a link 27. It will therefore be observed that the inner end of each arm or lever 24, 26 is in substantial vertical alinement with the line of driving contact of the wheels through which motion is conveyed from the drive shaft to the traction wheels of the vehicle. Because of this alinement of the parts, all deflecting movements of the steering mechanism act through the arms or levers 24, 26 to rock the yokes 14 and 20 along the vertical lines of driving contact of said gear wheels.

Any suitable means may be employed to impart deflecting or steering movement to the links 25, 27. In Figs. 1 and 5 I have represented a rod 28, suitably connected to the steering mechanism and jointed to an arm 29 of a bell crank lever pivoted at 30 and having its other arm 31 connected by a slot and pin connection or otherwise to said link 27. The said rod 28 is also jointed by a link 32 to one arm 33 of a bell crank lever pivoted at 34 and having its other arm 35 connected by a slot and pin to the link 25. In this manner longitudinal movement imparted to the rod 28 by the steering gear will move the links 27, 27 in the same direction, thereby oppositely to deflect the wheels 11, 12 as indicated in Fig. 5. Any other suitable means may be provided to connect the steering mechanism with said links 25, 27 and if desired I may employ connections to deflect the wheels on each side of the vehicle in the same direction. One form of such construction is represented in Fig. 6. wherein the rod 28 is connected to the link 25 by a link 36 and bell crank lever 37, and is connected to link 27 by bell crank 38. By reason of the described connection longitudinal movement of the rod 28 imparts opposite movement to the links 25, 27, thereby deflecting the traction wheels on each side in the same direction, as shown in Fig. 6, instead of in opposite directions, as shown in Fig. 5.

Instead of employing three gear wheels at one or both sides of the vehicle, as represented in Figs. 1 and 2, I may employ a greater number, such as five, as represented in Figs. 3 and 4. Therein the central yokes 39 are generally similar to the yokes 4 shown in Figs. 1 and 2, but are of increased length so as to receive and support the gear wheels 40, 41 and 42, the latter of which mesh or are in driving contact with the gear wheels 43, 44 of the traction wheels 45, 46. The said gear wheels 43 and 44 are mounted in the yokes 47, 48, preferably similar in general construction to the yokes 14 and 20 shown in Figs. 1 and 2, and similarly connected to the steering mechanism so that the lines of driving contact or pitch line of the teeth of the gears 41, 43, 42, 44 are in vertical alinement with the line of axial connection of the said yokes 39, 47 and 48. Any suitable steering connection may be employed in connection with that form of my invention shown in Figs. 3 and 4. It is of course evident that I am not restricted to any particular number of gear wheels at one or both sides of the vehicle, but the provision at one or both sides of the vehicle of an uneven number of gear wheels, such as three or five, I have found in practice to be preferable.

As previously stated, I may provide two traction wheels at one side of the vehicle and but a single traction wheel at the other side, or may provide some other arrangement of the traction wheels. In Figs. 7 and 8 I have shown at one side of the vehicle two traction wheels 49, 50, and at the other side a single traction wheel 51, the latter being connected in any suitable manner to the drive shaft as by means of a knuckle joint 52, the members of which are respectively rigid with the traction wheel 51 and with the drive shaft. At the opposite side of the vehicle I employ a series of yokes, preferably similar to those shown in either Figs. 1 and 2 or 3 and 4. That is to say, I provide a central yoke 53 and end yokes 54, 55, here shown as similar in general construction to the corresponding yokes shown in Figs. 1 and 2. Supported in the yokes 54, 55 are gear wheels 56, 57, meshing or in driving contact with a gear wheel 58 mounted or supported in the central yoke 53. The line of driving contact or the pitch line of the teeth of the gear wheels, if toothed gears are provided, is in each case in vertical alinement with the lines of axial connection of the said yokes 53, 54, 55, as described with respect to the preceding figures.

In connection with the yokes 54, 55, I provide levers or arms 59, 60, the inner ends of which are in the described vertical alinement, and the outer ends of which are jointed to links 61, 62. The link 62 is connected to bell crank lever 64 jointed to steering rod 65, and the link 61 is connected to the same steering rod by links 66 and bell crank lever 67. By the described connection, longitudinal movement imparted through the steering gear to the rod 65 will deflect the traction wheels 49, 50 in opposite directions as indicated in Fig. 10. In the construction shown in Figs. 7 and 10, the traction wheel 51 is not laterally deflected. In certain cases, as when the two traction wheels at one side are to be laterally deflected in parallelism, I provide for deflecting the single traction wheel 51 at the opposite side of the vehicle, the deflection of this wheel being in parallelism with that of the wheels 49, 50. For this purpose, I have in Fig. 11 shown connections to the steering rod 65 consisting of a link 68 connected by bell crank 69 to the lever arm 60; a link 70 connected to an arm of the bell crank lever 71, which itself is connected by link 72 to the lever arm 59; and by link 73 to the lever arm 74 by which steering movement is imparted to the wheel 51.

Having thus described one illustrative embodiment of my invention, I desire it to be understood that although specific terms are employed, they are used in a generic and descriptive sense and not for purposes of limitation, the scope of the invention being set forth in the following claims.

1. Running gear for trackless, power driven vehicles comprising in combination a body, a driving axle supported therein, a gear at one end of said axle, a frame and a pair of traction wheels at the same side of said body as said gear, a pair of gear wheels respectively co-axial with said traction wheels and meshing with said axle gear, and supplemental frames for said traction wheels and their gear wheels and jointed to said frame, the axial lines of said supplemental frame joints being in substantially vertical alinement with the lines of driving contact of said gear wheels.

2. Running gear for trackless, power driven vehicles comprising in combination a body, a driving axle supported therein, a gear at the end of said axle, a pair of traction wheels at the same side of said body as said gear, a train of gear wheels in driving engagement with said axle gear wheel and in driving relation to said traction wheels, and main and supplemental frames for said gear wheels, said frames being laterally deflectable with respect to each other on lines substantially coincident with the lines of driving contact of a plurality of said gear wheels.

3. Running gear for trackless power driven vehicles comprising in combination a truck having a driving axle, a gear at one end of said axle, a frame and a traction wheel at the same side of said body as said gear, said traction wheel having a supplemental frame, and a gear in driving relation to said axle gear, and external thereto, said frame and supplemental frame being laterally deflectable with respect to each other upon a line substantially coincident with a line of driving contact between said axle gear and traction wheel gear and which is substantially normal to the axes of said gears.

4. Running gear for trackless power driven vehicles comprising in combination a truck having a driving axle, a gear at one end of said axle, a traction wheel having a gear external to said first-mentioned gear, said wheel and gear being at the same side of the body as said axle gear and in driving relation thereto, a main frame for said axle gear, a supplemental frame for said traction wheel and gear, said main and supplemental frames being at the same side of the truck and jointed to each other on a line coincident with a line of driving contact of said gear wheels and which is substantially normal to the axes of said gears.

5. A running gear for trackless power driven vehicles comprising in combination a body, a driving axle supported therein, a gear at one end of said axle, a yoke for said gear, a pair of traction wheels at the same side of said body as said yoke, each of said traction wheels having a gear wheel, and a pair of supplemental yokes jointed to the main yoke, the lines of joining of said main and supplemental frames being substantially coincident with the lines of driving contact of said gear wheels.

6. Running gear for trackless power driven vehicles comprising in combination a body, a driving axle supported therein, a toothed gear at one end of said axle, a main yoke for said gear, a pair of traction wheels at the same side of said body as said yoke, each of said traction wheels having a toothed gear meshing with said axle gear, and a pair of supplemental frames jointed to said main frame, the lines of joining of said frames being substantially coincident with the lines of driving contact of said gear wheels.

7. Running gear for trackless, power driven vehicles comprising in combination a body, a driving axle supported therein, a toothed gear at one end of said axle, a main yoke for said gear, a pair of traction wheels at the same side of said body as said yoke, each of said traction wheels having a toothed gear meshing with said axle gear, a pair of supplemental frames jointed to said main frame, the line of joining of said frames being substantially coincident with the lines of driving contact of said gear wheels, and steering mechanism connected to said supplemental frames, thereby laterally to deflect said traction wheels.

8. Running gear for trackless, power driven vehicles comprising in combination a body, a driving axle supported therein, one or more gear wheels in driving relation to said axle, a main frame at the same side of said body as said gear or gears, a pair of traction wheels at the same side of said body as said gear or gears, each of said traction wheels having a gear in driving relation with said gear or gears, and a pair of supplemental frames jointed to said main frame, the lines of joining of said main and supplemental frames being substantially coincident with the lines of driving contact of said gears.

9. Running gear for trackless power driven vehicles comprising in combination a truck having a driving axle, one or more gears in driving relation to said axle, a main frame for said gear or gears, a traction wheel at the same side of said body as said gear or gears and having a gear in driving contact with said gear or gears and external thereto, and a supplemental frame connected for lateral deflection to said main frame along a line substantially coinciding with the line of driving contact of the traction-wheel gear and the main frame gear and which is substantially normal to the axes of said gears, whereby said traction wheel gear, by deflection of said supplemental frame, is rocked upon a center substantially coincident with the line of driving contact of said traction-wheel gear and main-frame gear.

10. Running gear for trackless power driven vehicles comprising in combination a truck having a driving axle, one or more gears in driving relation to said axle, a main frame for said gears, a traction wheel at the same side of said body as said gear or gears and having a gear in driving contact with said gear or gears and external thereto, a supplemental frame connected for lateral deflection to said main frame along a line substantially coinciding with the line of driving contact of the traction-wheel gear and a driving-gear and which is substantially normal to the axes of said gears, and steering mechanism connected to said supplemental frame, whereby said traction wheel may be laterally deflected.

11. Running gear for trackless power driven vehicles comprising in combination a truck having a driving axle, one or more driving gears in driving relation to said axle, a traction wheel at the same side of said body as said gear or gears and having a driven gear in driving contact with said driving gear or gears and external thereto and a supplemental frame in which said traction wheel and its driven gear are mounted, said supplemental frame being supported by the body and mounted for lateral deflection with respect thereto on a line approximately coincident with the line of driving contact of the traction-wheel-driven gear and a driving gear whereby said traction-wheel driven gear, by deflection of said supplemental frame, is rocked upon a center substantially coincident with the line of driving contact of said traction-wheel driven gear and a driving gear and which is substantially normal to the axes of said gears.

In testimony whereof, I have signed my name to this specification, in the presence of two subscribing witnesses.

ISAAC E. PALMER.

Witnesses:
FRED. E. FOWLER,
THOS. W. HALLORAN.

Copies of this patent may be obtained for five cents each, by addressing the "Commissioner of Patents, Washington, D. C."